(12) United States Patent
Berry et al.

(10) Patent No.: US 6,222,554 B1
(45) Date of Patent: Apr. 24, 2001

(54) NAVIGATION IN THREE-DIMENSIONAL WORKSPACE INTERACTIVE DISPLAYS HAVING VIRTUAL FORCE FIELDS ASSOCIATED WITH SELECTED OBJECTS

(75) Inventors: Richard Edmond Berry, Georgetown; Shirley Lynn Martin; John Martin Mullaly, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/917,526

(22) Filed: Aug. 26, 1997

(51) Int. Cl.$^7$ .................................................. G06T 15/20
(52) U.S. Cl. ...................... 345/427; 345/473; 345/474; 345/355; 345/357
(58) Field of Search .................................. 345/427, 433, 345/473, 474, 355, 357, 959

(56) References Cited

U.S. PATENT DOCUMENTS

| | | | |
|---|---|---|---|
| 5,359,703 | * 10/1994 | Robertson et al. | 395/119 |
| 5,414,801 | * 5/1995 | Smith et al. | 395/119 |
| 5,416,713 | 5/1995 | Kameda et al. | 364/461 |

OTHER PUBLICATIONS

"Destructive Solid Geometry for Interactive Entertainment and Training": B.F. Naylor; CSG96: Set theoretic Solid Modelling: Techniques & Applications; Proceedings of the conference held in Winchester, Apr. 1996; Published by Information Geometers(85–99).*

"Rapid Controlled Movement Through a Virtual 3D Space": Jock D. Mackinlay, Stuart K.Card, George G. Robertson; Computer Graphics, vol. 24, No. 4, Aug. 1990.*

"The Animation of Autonomous Actors Based on Production Rules": Hansrudi Noser, Daniel Thalmann; Proceedings. Computer Animation '96: p 47–57; publisher: IEEE Computer Society Press, Los Alamitos, CA; ISBN: 08186 7588 8.* http://www–personal.engin.umich.edu/~johannb/vff&vfh.htm: "The Virtual Force Field and the Vector Field Histogram Methods—Fast Obstacle Avoidance for Mobile Robots", 1993.*

* cited by examiner

*Primary Examiner*—Mark Zimmerman
*Assistant Examiner*—Mano Padmanabhan
(74) *Attorney, Agent, or Firm*—J. B. Kraft; Volel Emile

(57) ABSTRACT

In a data processor controlled display system having three-dimensional objects laid out in a three-dimensional virtual workspace, the objects have associated therewith virtual force fields around their peripheries. These force fields are defined by data stored in association with the data defining the objects. User interactive navigation means are provided for moving the viewpoint along a selected path at a velocity input by the viewer. Further, means are provided for exerting on said moving viewpoint, the force component of said field at the coordinate position of the viewpoint.

15 Claims, 6 Drawing Sheets

NAVIGATION IN THREE-DIMENSIONAL WORKSPACE INTERACTIVE DISPLAYS HAVING VIRTUAL FORCE FIELDS ASSOCIATED WITH SELECTED OBJECTS

CROSS-REFERENCE TO RELATED APPLICATION

Copending application, "Climbability: A Property For Objects in 3-D Virtual Environment", J. Mullaly et. al. (Attorney Docket No. AT9-97-212) relates to objects with barriers which viewpoints may climb over. Also copending application, "Navigation with Optimum Viewpoints in Three-Dimensional Workspace Interactive Displays Having Three-Dimensional Objects with Collision Barriers", R. Berry et. al. Attorney Docket No. At9-97-179) relates to collision barriers associated with selected objects. Both are assigned to the assignee of the present invention.

BACKGROUND OF THE INVENTION

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are easy to comprehend and use. This has resulted in a demand in the marketplace for interfaces which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of objects as realistic, three-dimensional (3D) models rather than as the icons and two-dimensional desktops of conventional windows-oriented computer technology.

Some examples of current technology for the creation of virtual three-dimensional workspace display interfaces are copending applications Ser. No. 08/813,891 filed Mar. 7, 1997, entitled "VIEWER INTERACTIVE OBJECT IN VIRTUAL THREE-DIMENSIONAL WORKSPACE" and Ser. No. 08/813,848 filed Mar. 7, 1997, entitled "VIEWER INTERACTIVE OBJECT WITH MULTIPLE SELECTABLE FACE VIEWS IN VIRTUAL THREE-DIMENSIONAL WORKSPACE", both filed on Mar. 10, 1997 and assigned to the assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. No. 5,276,785.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal that he is pursuing.

The present invention addresses this problem, i.e. that of helping the interactive user in three-dimensional graphic environments to stay focused and relate to the paths he is seeking to travel to in the manner he is seeking to travel to reach objects even when these objects are arranged in 3D space in what appears to be infinite configurations. The invention facilitates the user's navigation in the 3D space so that the user may easily and quickly continue on his navigational path and stick to his navigational objectives. The invention aids the navigating viewer in relating to objects which could be impediments to navigation. It also facilitates the viewer's maneuvering of his viewpoint.

SUMMARY OF THE INVENTION

It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. A key need of a viewer navigating through virtual three-dimensional space is to stay focused and navigate as easily as possible and thus permit this viewer to concentrate and focus on his planned tasks rather than the navigation itself.

The present invention provides the viewer with functions which will aid his navigation by enhancing viewpoint movements which promote navigation goals and deterring navigation movements which oppose the navigation goals. This is accomplished through the creation of "benevolent" virtual force fields which are respectively associated with virtual objects in the in the three-dimensional workspace through which the viewer is navigating. Data defining such force fields is stored in association with the data defining the respective virtual objects. Accordingly, when the viewer is moving the viewpoint on a path through a virtual three dimensional workspace, he imparts to the moving viewpoint a velocity, a vector which has both magnitude and direction.

The present invention provides the designer of the virtual workspace with the means for designing and creating for each object a force field tailored to provide to a viewpoint movement approaching or in proximity to such object, an enhancement or retardant force on the viewpoint to optimize the navigation path and time. The virtual force acts in combination with the viewpoint movement velocity to either accelerate or decelerate the viewpoint velocity. Thus if the path of the viewpoint movent is approaching the object, then the force usually acts to decelerate or if there is a passageway through an object or between objects, the force acts to accelerate the passage by the object. In addition, if the path of viewpoint movement includes a turn from a rectilinear direction, the force components in the force field may be arranged so as to "smooth out" the turn, i.e., they may vary the acceleration of the viewpoint movement in proportion to the sharpness of the turn. Usually, the sharper the turn, the greater the deceleration will be.

DETAILED DESCRIPTION OF THE PREFERRED EMBODIMENT

Figure 1:
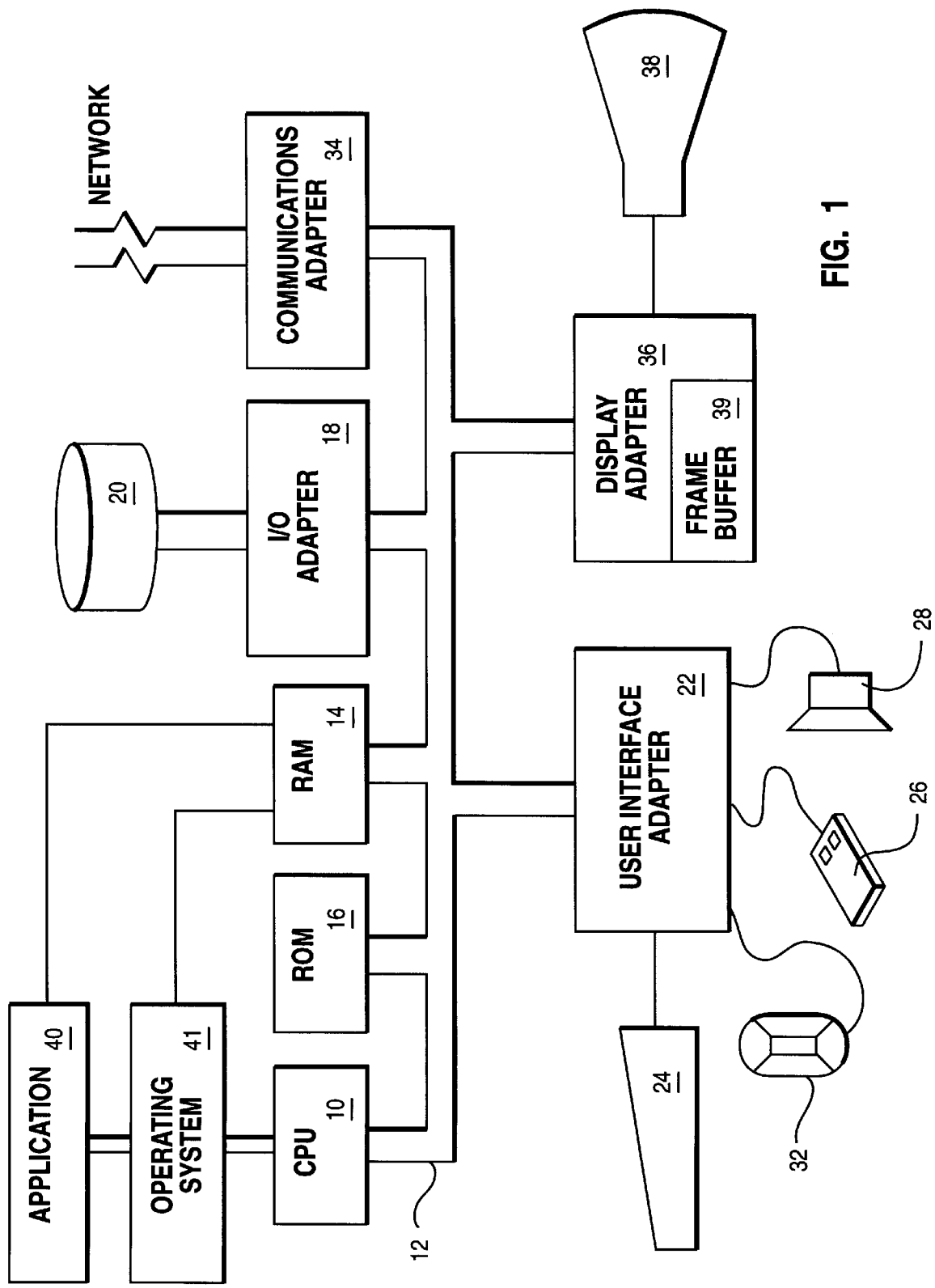
FIG. 1 is a block diagram of a data processing system including a central processing unit which is capable of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two objects is the perceptible distance between them and can be determined from their coordinates if they are presented so that they appear to be positioned at their coordinates. As will be discussed hereinafter in greater detail, the viewer in this 3-D space has a variety of functions to perform and travels from object to object to perform such functions. In doing so, he must navigate through workspaces laden with a variety of objects. The virtual force fields of the present invention are designed to facilitate this navigation.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The three-dimensional workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods. Thus, in implementing the present invention, selected objects may contain surrounding virtual force fields which are stored as part of the object entity. These force fields are designed to facilitate navigation relative to such objects. Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing. Those skilled in the art will understand how the present invention is implemented using object oriented programming techniques as described above.

With this background of the various expedients which may be used to implement the present invention, the preferred embodiments will now be described.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation program such as the previously described VRT of Superscape in the RAM 14 of the system of FIG. 1. Also stored on the RAM will be a suitable operating system such as DOS or Windows. The operating system of the VRT application is diagrammatically shown in FIG. 1 as operating system 41 in which application 40 operates.

An embodiment of the present invention will now be described starting with respect to the task specific portion of a virtual reality three-dimensional workspace shown in FIG. 2. This portion has been diagrammatically made sparse so as to retain only those objects necessary to illustrate the features of this invention. Workspace 49 has several objects: paired bookcases 42 and 43 with passage 50 therebetween, small table 44, kiosk 45, railing 46 and enclosing walls 47 and 48 which for purposes of this illustration leave passage 50 as the only entry into workspace foreground 49. As will be seen hereinafter with respect to FIG. 3, paired bookcases 42 and 43 have virtual force fields arranged to expedite navigation through passage 50 and kiosk 45 is surrounded by a force field designed to expedite navigation around it.

Figure 2:
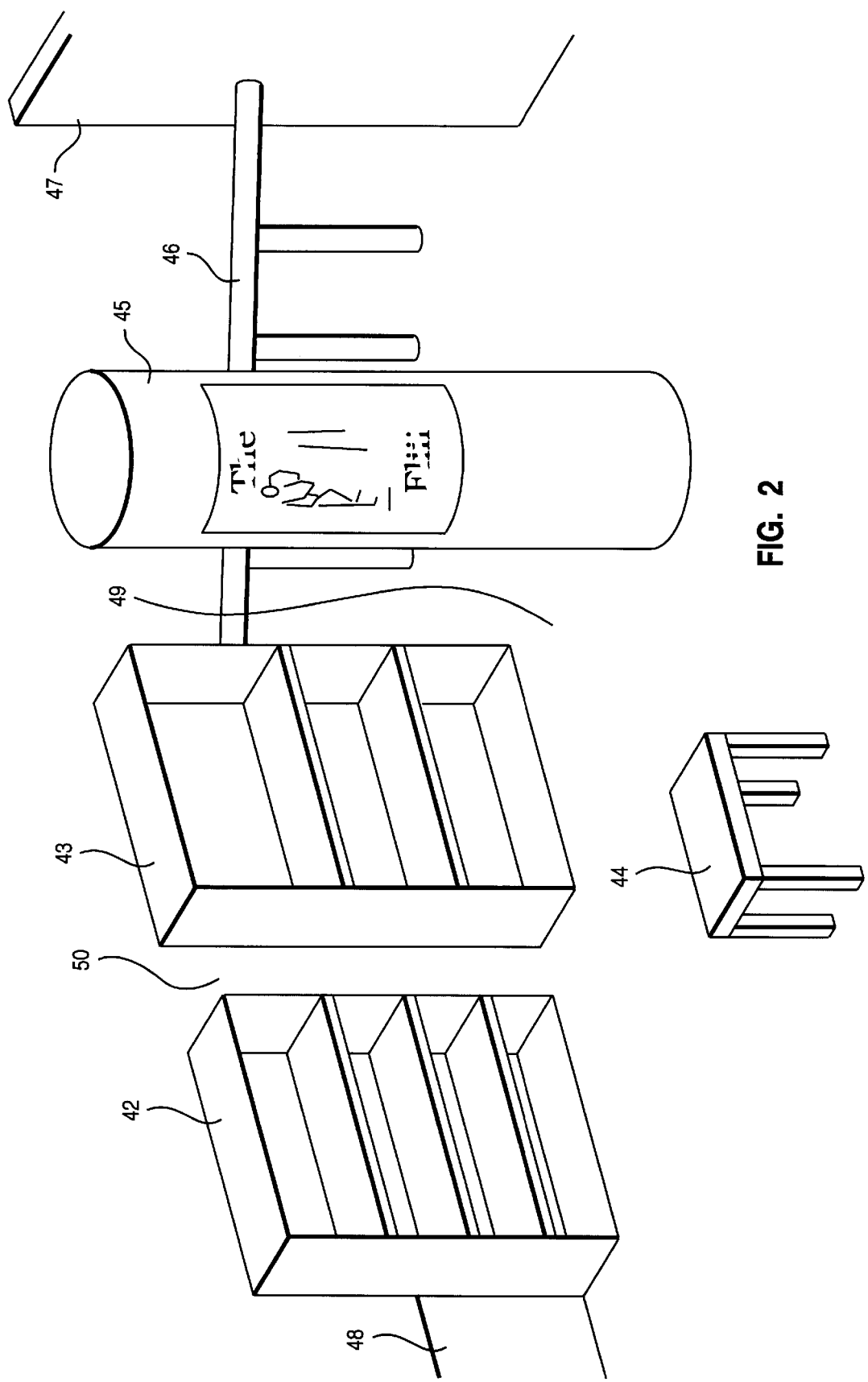
FIG. 2 is a is a simplified diagrammatic view of a three-dimensional workspace containing a few 3-D objects.

The image in FIG. 2 is a simplified diagram of a viewpoint of a three-dimensional space presented to the viewer at a display interface such as that which could be shown on display monitor 38 of FIG. 1. In accordance with conventional techniques, the user may control the viewpoint 50 through conventional I/O devices such as mouse 26 in FIG. 1 which operates through user interface 22 to call upon the VRT programs in RAM 14 cooperating with the operating system 41 to create the images in frame buffer 39 of display adapter 36 to control the display on monitor 38. Using conventional virtual three-dimensional workspace navigation techniques, the viewpoint interface of the user shown in FIG. 2 is changeable as the user moves closer or backs away from objects in the workspace or moves to the right or left in the workspace. All this may be controlled by a suitable I/O device such as mouse 26 of FIG. 1 or a joystick.

Figure 3:
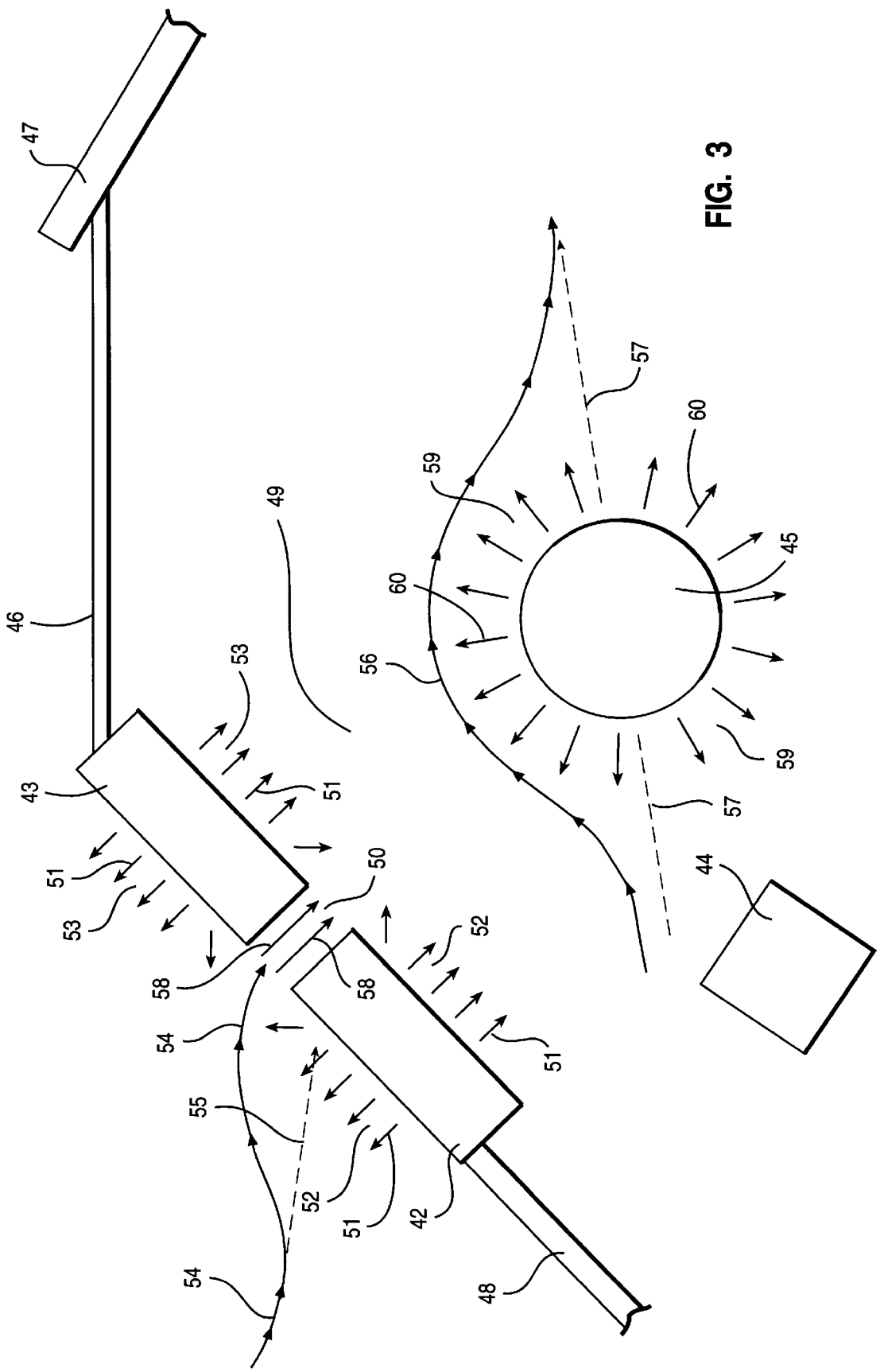
FIG. 3 is a diagrammatic representation of a top or plan view of the workspace of FIG. 2 showing the force fields surrounding objects and the and the effects of these fields upon viewpoint movement.

While for simplicity of illustration, the view of the workspace shown in FIG. 3 which is a top view of the space shown in three dimensions in FIG. 2 is presented in a single plane in FIG. 3, it should be understood that the movement may be along any path in the three orthogonal: x y and z directions.

With reference to FIG. 3, all of the objects of FIG. 2 are shown in overhead or plan view including paired bookcases 42 and 43, passage 50 as well as kiosk 45. The virtual force fields, 52 and 53 respectively surrounding bookcases 42 and 43 are shown made up of individual force lines 51. These force lines are a diagrammatic expedient. Actually the virtual force fields may be considered to be made up of matrices of points surrounding their respective objects, bookcases 42 and 43. In this two dimensional illustration, each of these points in these matrices have x,y coordinate values but should be considered to have x,y,z coordinate values in the 3-D workspace. Thus, when a viewpoint is moved in a path at a viewer selected velocity during navigation, the component of the force field at each point will exert its force on the moving viewpoint when said viewpoint crosses the force field point. Since each force field component is a vector, the component may be designed to affect both the magnitude, i.e., speed of the moving viewpoint as well as its direction.

Before proceeding further with the description of FIG. 3, it should be indicated how the user interface prior art imparts and controls viewpoint movement velocity during navigation. This may be customarily achieved through such input devices as track ball 32 or mouse 26 in FIG. 1. One standard way by which viewpoint velocity is customarily accelerated is by holding the viewpoint along a constant path with the mouse or trackball. As long as the viewpoint stays on the constant path, speed is increased. Likewise, velocity control may be achieved through a conventional joystick input device. The speed in a given direction may be controlled by pushing or pulling back on the joystick.

Returning now to FIG. 3, viewpoint path 54 is shown. If it were not for force field 52 associated with bookcase 42, the viewpoint path would proceed along dotted line 55 and crash into bookcase 52. However, the force field 52 is designed so that viewpoint path 55 is slowed down and then altered so it is directed to passage 50 which then has force components 58 which accelerate viewpoint path 54 through passage 50. In this connection, it should be understood that force fields such as force fields 52 and 53 adjacent to a passage such as passage 50 may be constructed so as to be direction sensitive, i.e. the force field would be structured so that if a viewpoint path was being navigated from the interior of workspace 49 out through passage 50 in a direction opposite that of path 54, then force components 58 would be switched to act in the opposite direction from that shown to accelerate the path out through passage 50.

In a manner similar to that described, viewpoint path 56 may routed around kiosk 45 by force field 50 associated with kiosk object 45 which has the radiating force lines 60. Were it not for this field, the projected navigation path would have been along line 57 into kiosk 45.

The manner by which the vector virtual force field components affect the scaler magnitude, i.e., speed of the viewpoint movement and the vector direction of movement is basic physics which should be readily understood by those skilled in the art. The principles are fully set forth in the text "Calculus With Analytical Geometry.", Denis E. Zill, published by Prindle, Weber and Schmidt, 1985, at Section 14.2.

Figure 4:
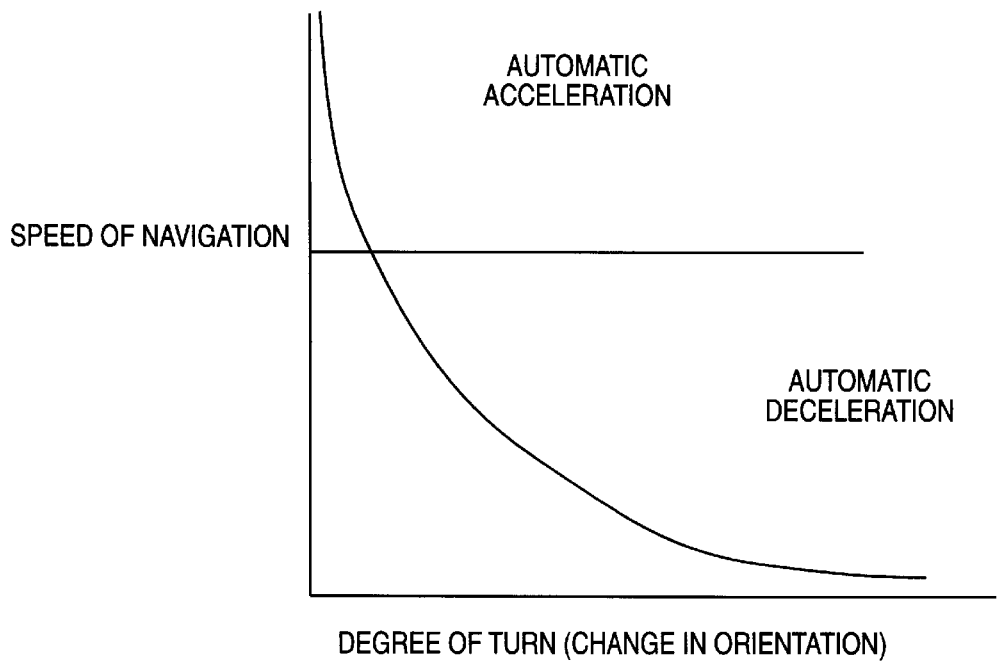
FIG. 4 is a graph showing the effect of a selected virtual force field on the velocity of viewpoint movement during turns of viewpoint movement paths from a straight-line or rectilinear path.

The force fields of the present invention may be used to control viewer initiated turns in navigation paths so as to smooth out transitions in such turns. With reference to FIG. 4, there shown a graph of how force fields may be used to control turns. Let us assume that the path of navigation is proceeding initially in a direction wherein the force field component forces are in the same direction as the direction of the navigation path. This could be for example in FIG. 3 when path 54 emerges from the passage 50 into inner workspace 49. Lines of force 58 are essentially parallel to the path of travel. If the viewer then initiates a right or left turn and thus moves in a direction towards the perpendicular to force lines 58, then its direction and will be affected as shown in the graph of FIG. 4 where the degree of turn is the abscissa and the resulting speed is the ordinate.

Figure 5A:
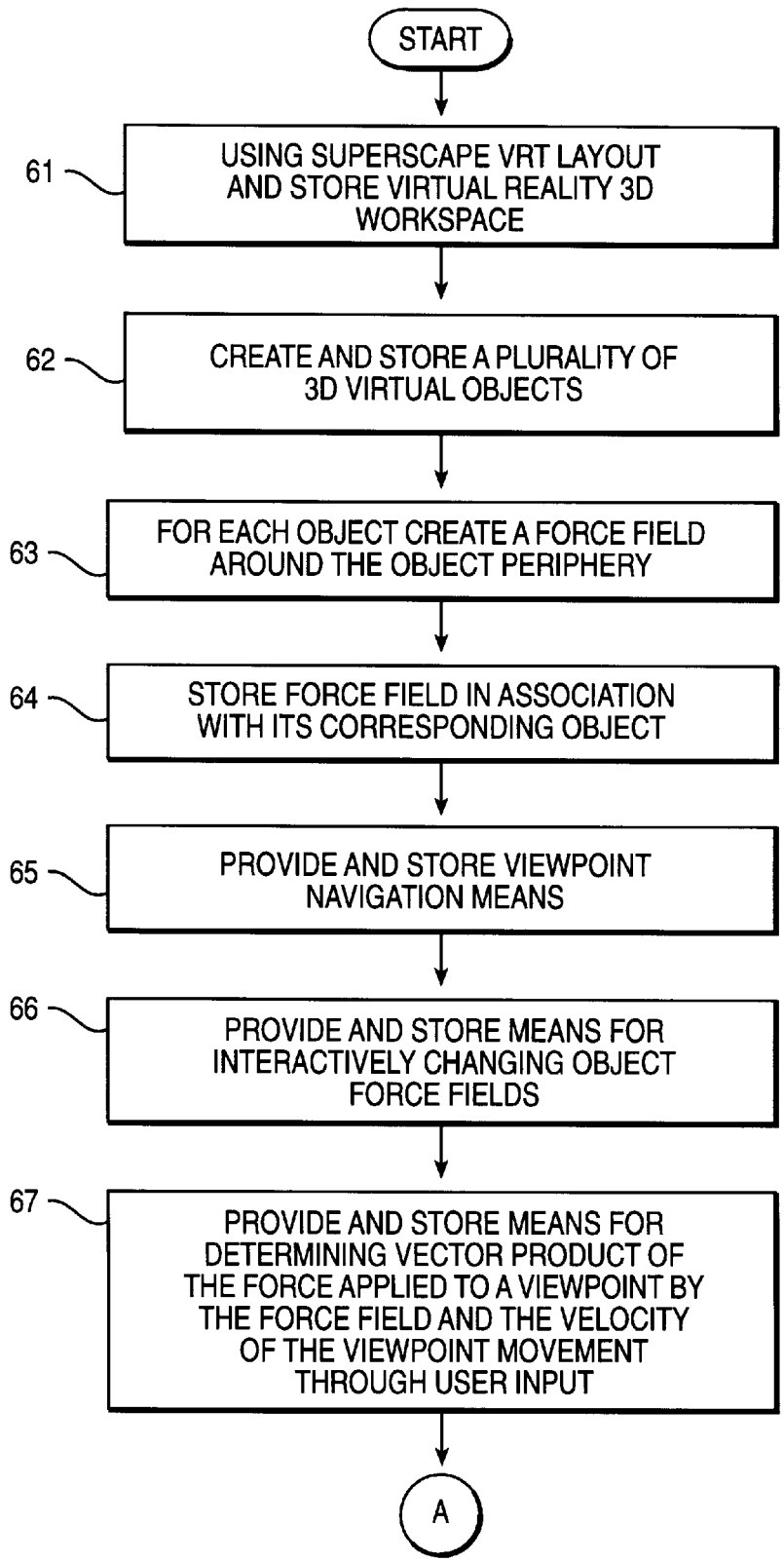
FIGS. 5A and 5B are flowcharts of the process implemented by the present invention (FIG. 5A) and for navigating through the three-dimensional workspace layout (FIG. 5B).
Figure 5B:
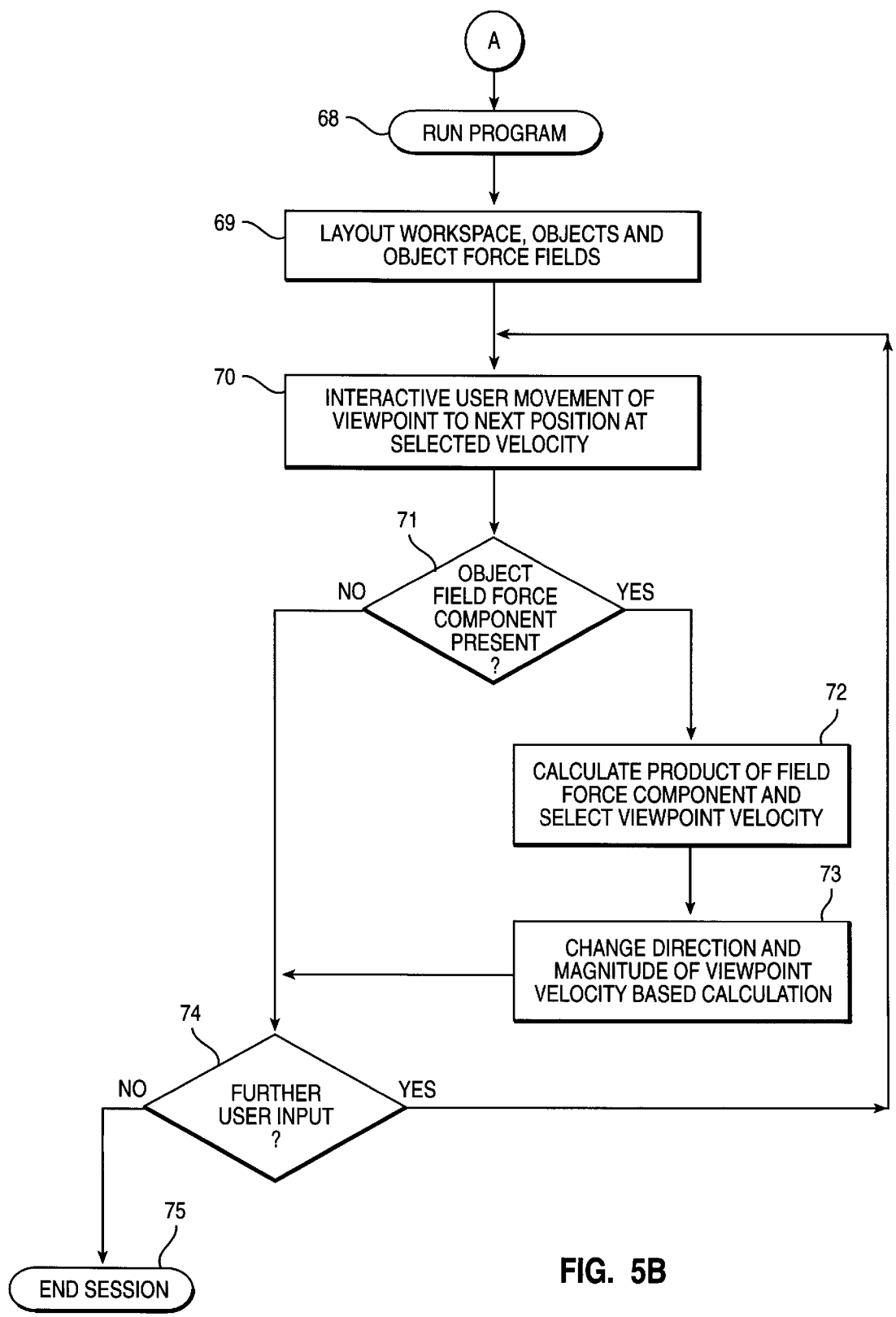

Now with reference to FIGS. 5A and 5B, we will describe a process implemented by the present invention in conjunction with the flowcharts of FIGS. 5A and 5B. First, the steps in FIG. 5A relate to the development of the virtual reality workscape, the functional objects and their positioning in the workscape in accordance with the present invention using the previously described Superscape VRT programming toolkit. They also include the development for each object of a force field around the object periphery. First, step 61, the desired virtual reality three-dimensional workspace is created and stored. This would be, for example, the workspace shown in FIG. 2 and diagrammatically shown as a plan view of FIG. 3. Next, step 62, the virtual reality three-dimensional objects which will be placed in a landscape are created and stored. Then, step 63, a force field is created for each object around the object periphery. Then, step 64, such force fields are stored in association with their respective corresponding objects.

Next, step 65, there is provided and stored navigation means for changing the viewpoint of the viewer at the display interface responsive to the viewer interactively selecting appropriate navigation paths. These navigation means can be any conventional navigation means for proceeding along a particular path. Next, step 66, there is created and stored means for viewer-interactively changing such force field if desired. Then, step 67, means are provided and stored for determining the effects of the component forces in the virtual force fields upon the direction and speed of the viewer input navigation paths. This may any program for calculating vector values according to the prior art principles set forth hereinabove.

The process now proceeds to point A in FIG. 5B whereat the created virtual reality landscape program is run, step 68. As previously mentioned, the program is run on a system such as that shown in FIG. 1 with particular application programs being loaded on RAM 14, connected to display buffer 36 which forms the stored images via frame buffer 39 controlling the display monitor 38. The program initially sets up the workspace layout on the display, step 69; this includes laying out the objects as well as their corresponding object force fields. Then, step 70, the interactive user input for navigation viewpoint movement is monitored. At each point in the navigation path, a determination is made, step 71, as to whether a field force component is present. If there is such a component, then the flow goes to step 72 where the product of the viewpoint velocity and the field component force is calculated as previously described and step 73, the direction and magnitude of the viewpoint navigation path is changed accordingly. The flow then proceeds to decision step 74 where the next user input is awaited; this is the same point that the flow would be at if the decision from decision step 71 had been negative. If there is no further input, then the process proceeds to end the session, step 75. If there is further input, then the flow returns to step 70, and the input results in the further movement of the viewpoint as previously described.

Although certain preferred embodiments have been shown and described, it will be understood that many changes and modifications may be made therein without departing from the scope and intent of the appended claims.

What is claimed is:

1. A data processor controlled display system for displaying a virtual three-dimensional workspace comprising:
   means for displaying a plurality of virtual three-dimensional objects within said workspace;
   user interactive navigation means for moving user viewpoints through a plurality of coordinate positions along a selected path within said workspace;
   means for storing in association with each of a plurality of said virtual objects, data defining a virtual force field around the periphery of the object;
   means responsive to moving a viewpoint into said force field for exerting on said viewpoint, the force component of said field at said coordinate position; and
   user-interactive means for applying an accelerating force to said viewpoint movement along said selected path,
   whereby said force component of said field acts in combination with said accelerating force to provide a resultant viewpoint movement velocity.

2. The display system of claim 1, wherein said force components of said field are distributed so as to decelerate the viewpoint movement velocity as the viewpoint approaches the object associated with said field.

3. The display system of claim 1, wherein said object associated with said field has a passageway therethrough, and said force components of said field are distributed so as to accelerate the viewpoint movement through said passageway.

4. The display system of claim 1, wherein said force components of said field are distributed so as to accelerate the viewpoint movement velocity as the viewpoint passes the object associated with said field.

5. The display system of claim 1, wherein the path of said viewpoint movement includes a turn from a rectilinear direction and said force components of said field are distributed so to vary the acceleration of the viewpoint movement velocity in proportion to the sharpness of the angle of said turn with reference to said rectilinear direction.

6. A computer implemented method for displaying a virtual three-dimensional workspace comprising:
   displaying a plurality of virtual three-dimensional objects within said workspace;
   interactively moving user viewpoints through a plurality of coordinate positions along a selected path within said workspace;
   storing in association with each of a plurality of said virtual objects, data defining a virtual force field around the periphery of the object;
   in response to moving a viewpoint into said force field for exerting on said viewpoint, the force component of said field at said coordinate position; and
   interactively applying an accelerating force to said viewpoint movement along said selected path,
   whereby said force component of said field acts in combination with said accelerating force to provide a resultant viewpoint movement velocity.

7. The method of claim 6, wherein said force components of said field are distributed so as to decelerate the viewpoint movement velocity as the viewpoint approaches the object associated with said field.

8. The method of claim 6, wherein said object associated with said field has a passageway therethrough, and said force components of said field are distributed so as to accelerate the viewpoint movement through said passageway.

9. The method of claim 6, wherein said force components of said field are distributed so as to accelerate the viewpoint movement velocity as the viewpoint passes the object associated with said field.

10. The method of claim 6, wherein the path of said viewpoint movement includes a turn from a rectilinear direction and said force components of said field are distributed so to vary the acceleration of the viewpoint movement velocity in proportion to the sharpness of the angle of said turn with reference to said rectilinear direction.

11. A computer program having data structures included on a computer readable medium which causes the display on a data processor supported display of a virtual three-dimensional workspace comprising:
   means for displaying a plurality of virtual three-dimensional objects within said workspace;
   user interactive navigation means for moving user viewpoints through a plurality of coordinate positions along a selected path within said workspace;
   means for storing in association with each of a plurality of said virtual objects, data defining a virtual force field around the periphery of the object;
   means responsive to moving a viewpoint into said force field for exerting on said viewpoint, the force component of said field at said coordinate position; and
   user-interactive means for applying an accelerating force to said viewpoint movement along said selected path,
   whereby said force component of said field acts in combination with said accelerating force to provide a resultant viewpoint movement velocity.

12. The computer program according to claim 11, wherein said force components of said field are distributed so as to decelerate the viewpoint movement velocity as the viewpoint approaches the object associated with said field.

13. The computer program according to claim 11, wherein said object associated with said field has a passageway therethrough, and said force components of said field are distributed so as to accelerate the viewpoint movement through said passageway.

14. The computer program according to claim 11, wherein said force components of said field are distributed so as to accelerate the viewpoint movement velocity as the viewpoint passes the object associated with said field.

15. The computer program according to claim 11, wherein the path of said viewpoint movement includes a turn from a rectilinear direction and said force components of said field are distributed so to vary the acceleration of the viewpoint movement velocity in proportion to the sharpness of the angle of said turn with reference to said rectilinear direction.

* * * * *